United States Patent [19]

Kataoka

[11] Patent Number: 4,563,071

[45] Date of Patent: Jan. 7, 1986

[54] CORRECT EXPOSURE ANNUNCIATOR CIRCUIT

[75] Inventor: Hiroyuki Kataoka, Saitama, Japan

[73] Assignee: Canon Kabushiki Kaisha, Tokyo, Japan

[21] Appl. No.: 672,856

[22] Filed: Nov. 19, 1984

Related U.S. Application Data

[63] Continuation of Ser. No. 429,511, Sep. 30, 1982.

[30] Foreign Application Priority Data

Oct. 13, 1981 [JP] Japan .................................. 56-163146

[51] Int. Cl.[4] ............................................. G03B 15/05
[52] U.S. Cl. .................................... 354/473; 354/127.1
[58] Field of Search ............... 354/413, 416, 471, 473, 354/127.1, 127.11, 127.12

[56] References Cited

U.S. PATENT DOCUMENTS

| | | | |
|---|---|---|---|
| 4,122,465 | 10/1978 | Hasegawa et al. | 354/416 |
| 4,331,406 | 5/1982 | Kiuchi et al. | 354/127.12 |
| 4,351,600 | 9/1982 | Hasegawa et al. | 354/413 |
| 4,444,483 | 4/1984 | Nakajima | 354/127.12 |
| 4,469,419 | 9/1984 | Ishida et al. | 354/127.1 |

*Primary Examiner*—Russell E. Adams
*Attorney, Agent, or Firm*—Toren, McGeady, Stanger, Goldberg & Kiel

[57] ABSTRACT

Disclosed is a correct exposure annunciator device for cameras including a correct exposure annunciator, a timer for producing a timing signal a certain predetermined time after an exposure control cycle has been finished and a control for operating the correct exposure annunciator in accordance with the generation of a correct exposure representing signal and stopping the correct exposure annunciator with the generation of a timing signal.

7 Claims, 4 Drawing Figures

CORRECT EXPOSURE ANNUNCIATOR CIRCUIT

This is a continuation of application Ser. No. 429,511 filed Sept. 30, 1982.

BACKGROUND OF THE INVENTION

1. Field of the Invention

The present invention relates to improvements to correct exposure annunciator circuits for indicating a correct exposure when a computer type electronic flash device has emitted a flash light giving a proper film exposure.

2. Description of the Prior Art

Until now a correct exposure confirming device has been used to tell if the exposure amount is proper when the above-mentioned flash unit has emitted the whole flash light. The correct exposure confirming device is designed to indicate the correct exposure immediately after the light control circuit of the flash light device operates and stops the indication after a determined time lapse. However, if flash photography is carried out with a slow shutter time (for example 2 seconds), when the indication time of the device is 1 second, correct exposure confirmation is finished during the exposure control cycle, which is inconvenient. During the exposure control cycle it is usual for photographers to look at an object through the finder or look at the object directly when the camera is of a type in which no image can be seen in the finder during the exposure control cycle, so that even if the user tries to see the correct exposure after the exposure indication control cycle, it is often impossible to confirm the correct exposure with the conventional device because the correct exposure indication was dislodged.

One object of the present invention is to provide a correct exposure confirming device which can confirm a correct exposure no matter how long the shutter time, thus overcoming the above shortcoming.

SUMMARY OF THE INVENTION

The present invention is characterized in that in order to achieve the above purposed timing means for producing a timing signal after the lapse of a certain predetermined time after the exposure control cycle and an indication control means for actuating the correct exposure annunciator means in accordance with the generation of the correct exposure representing signal and stopping the operation of the correct exposure annunciator means in accordance with the generation of the timing signal are provided.

DESCRIPTION OF THE PREFERRED EMBODIMENTS

Figure 1:
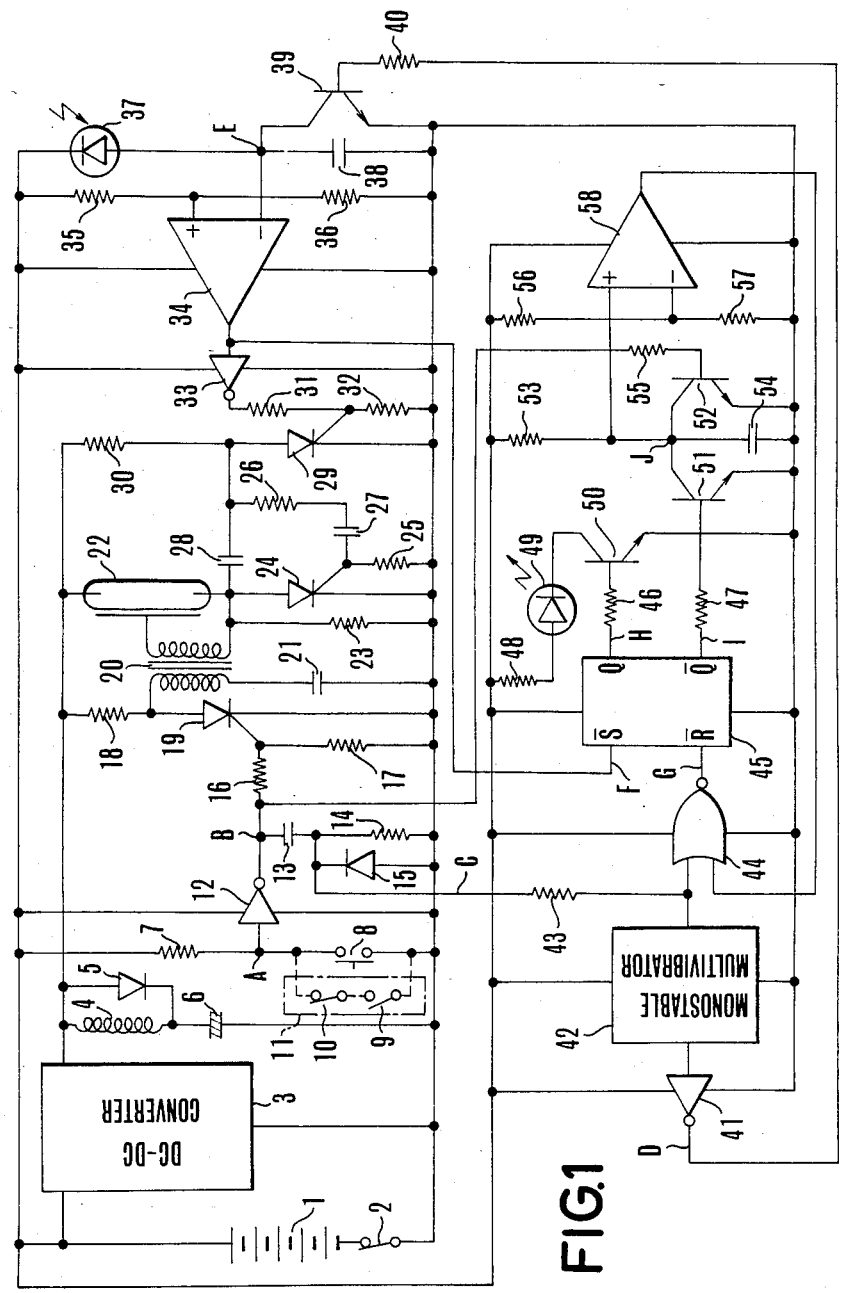
FIG. 1 shows an embodiment of the flash light device circuit of the present invention.

FIG. 1 shows the circuit of an embodiment of the flash light device having the correct exposure confirming device of the present invention. Reference numeral 1 identifies the power source, reference numeral 2 the power source switch, reference numeral 3 the conventional DC-DC converter, reference numeral 4 the inductance, reference numeral 5 the diode, reference numeral 6 the main capacitor, reference numeral 7 the resistance, reference numeral 8 the test switch, reference numeral 9 the X contact to be closed at the start of the shutter release operation and opened at the winding, and reference numeral 10 the safety switch to be opened at the end of the exposure control cycle and to be closed at the winding, whereby the X contact 9 and the safety switch 10 constitute a flash light synchronization switch 11 in the camera (not shown). Reference numeral 12 identifies an inverter, a capacitor 13 constitutes a differentiating circuit with a resistance 14, a diode 15 excludes the negative differentiated pulses, reference numerals 16-18 identify resistances, reference numeral 19 a thyristor for a trigger, reference numeral 20 a trigger transformer, reference numeral 21 a trigger capacitor, reference numeral 22 a flash light discharge tube, reference numeral 23 a resistance, reference numeral 24 a thyristor for stopping the flash light, reference numerals 25 and 26 resistances, reference numeral 27 a capacitor, reference numeral 28 a commutation capacitor, reference numeral 29 a commutation thyristor and reference numeral 30 a resistance, whereby components 23 30 constitute the light amount control circuit. Reference numerals 31 and 32 identify resistances, reference numeral 33 an inverter, reference numeral 34 a comparator, reference numerals 35 and 36 resistances, reference numeral 37 a light sensing element, reference numeral 38 a capacitor, reference numeral 39 a transistor, reference numeral 40 a resistance, reference numeral 41 a inverter, a monostable multivibrator 42 determines the light measuring circuit, reference numeral 43 a resistance, reference numeral 44 a NOR gate, reference numeral 45 a flip-flop, reference numerals 46-48 resistances, an LED 49 displays the correct exposure confirmation, reference numerals 50-52 identify transistors, reference numeral 53 a resistance, a capacitor 54 determines the timing of the correct exposure confirmation display after the termination of the exposure control cycle with the time constant with the resistance 53, resistances 55-57 and a comparator 58.

Figure 2:
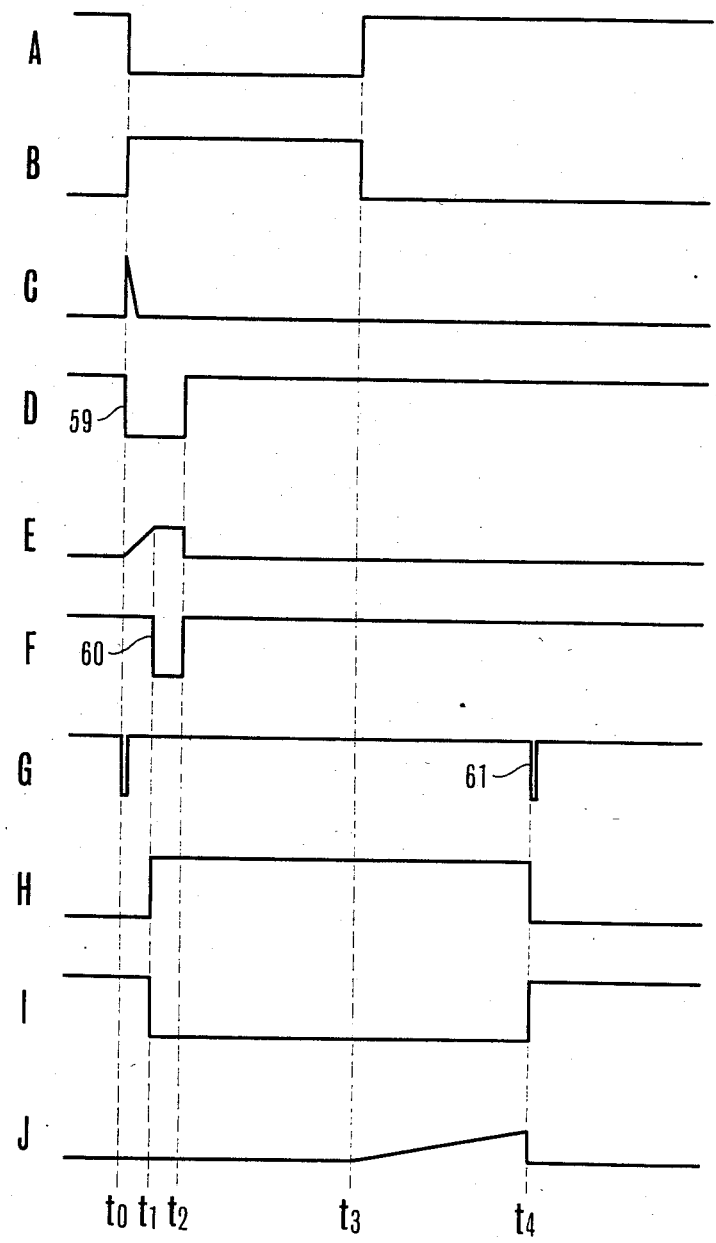
FIG. 2 shows a time chart for showing the wave forms at various points.

Below the operation will be explained in conjunction with the time chart showing the potentials at A-J in FIG. 2.

When the shutter release button (not shown in the drawing) is depressed at t0, the diaphragm is controlled at a certain predetermined aperture value with a conventional method and then the leading shutter curtain starts to run. Synchronized with the start of the leading shutter curtain, the X contact 9 is closed and the level of the potential at A, namely the input level of the inverter 12 becomes low so that the input level, namely the level of the potential at B becomes high, whereby the thyristor 19 is switched on to produce the trigger voltage at the secondary side of the trigger transformer and actuate the flash light discharge tube 22.

At the same time the output of the inverter 12 is differentiated with the condenser 13 and the resistance 14 and the differentiated pulse is produced at C. With this differentiated pulse the monostable multivibrator 42 produces a pulse with the same pulse width as the light measuring time, the pulse is converted into a low level pulse 59 with the inverter 41. The pulse 59 is put into the transistor 39 switching off the transistor 39 so that through the light sensing element a photo current, with a magnitude corresponding to that of the light reflected from the object, flows and changes the capacitor 38. Furthermore, the differentiated pulse is put into the NOR gate 44 so the output (the potential at G) of the gate 44 is at a low level and the flip-flop 45 is reset.

When the charge voltage of the capacitor 38 reaches the potential at the voltage dividing point of the resistances 35 and 36 at t11, the comparator 34 produces a correct low level exposure signal 60, while the output level of the inverter 33 becomes high so that the thyristor 28 is switched on and the thyristor 24 switched off to interrupt the current through the flash light discharge tube and stop the flash light. The correct exposure signal 60 is input at the set input terminal $\overline{S}$ of the flip-flop 45 to set the flip-flop 45, while the potential level at the output terminal Q(at H) becomes high to switch on the transistor 50 and put on the light emitting diode 49. Although the potential level at the output terminal $\overline{Q}$(at I) becomes low switching off the transistor 51, the potential level at B is high so that the transistor 52 is switched on and the capacitor 54 is not charged.

When the trailing shutter curtain (not shown in the drawing) starts to run at t3, the exposure control cycle is finished and the safety switch 10 is opened, the potential level at B becomes low so that the transistor 52 is switched off and a charge current runs through the capacitor 54 through the resistance 53. The charge current of the capacitor 54 reaches the potential at the voltage dividing point of the resistances 56 and 57 after the lapse of a predetermined time (t4 -t3) with the time constant of the capacitor 54 and the resistance 53 and the comparator 58 producing a high level timing signal, which is inverted into a low level timing signal 61 with the NOR gate 44 and resets the flip-flop 45. Consequently, the transistor 50 is switched off and the light emitting diode 49 is put off.

When the exposure control cycle is finished, the light emitting diode 49 goes on for a predetermined time (t4 - t3). In this way, the photographer can recognize the correct exposure signal no matter what the shutter time.

When the flash light discharge tube 22 emits the whole flash light due to the short of light, the comparator 34 does not produce the correct exposure signal so that the flip-flop 45 is not set and the light emitting diode 49 is not turned on.

When the film is wound and the shutter is released again between t3 and t4 during correct exposure, the flip-flop 45 is reset with the afore mentioned operation and the light emitting diode 49 is turned out, while the transistor 52 is switched on due to the high level potential at B so that the capacitor 54 is short circuited and the output level of the comparator 58 becomes low again.

Figure 3:
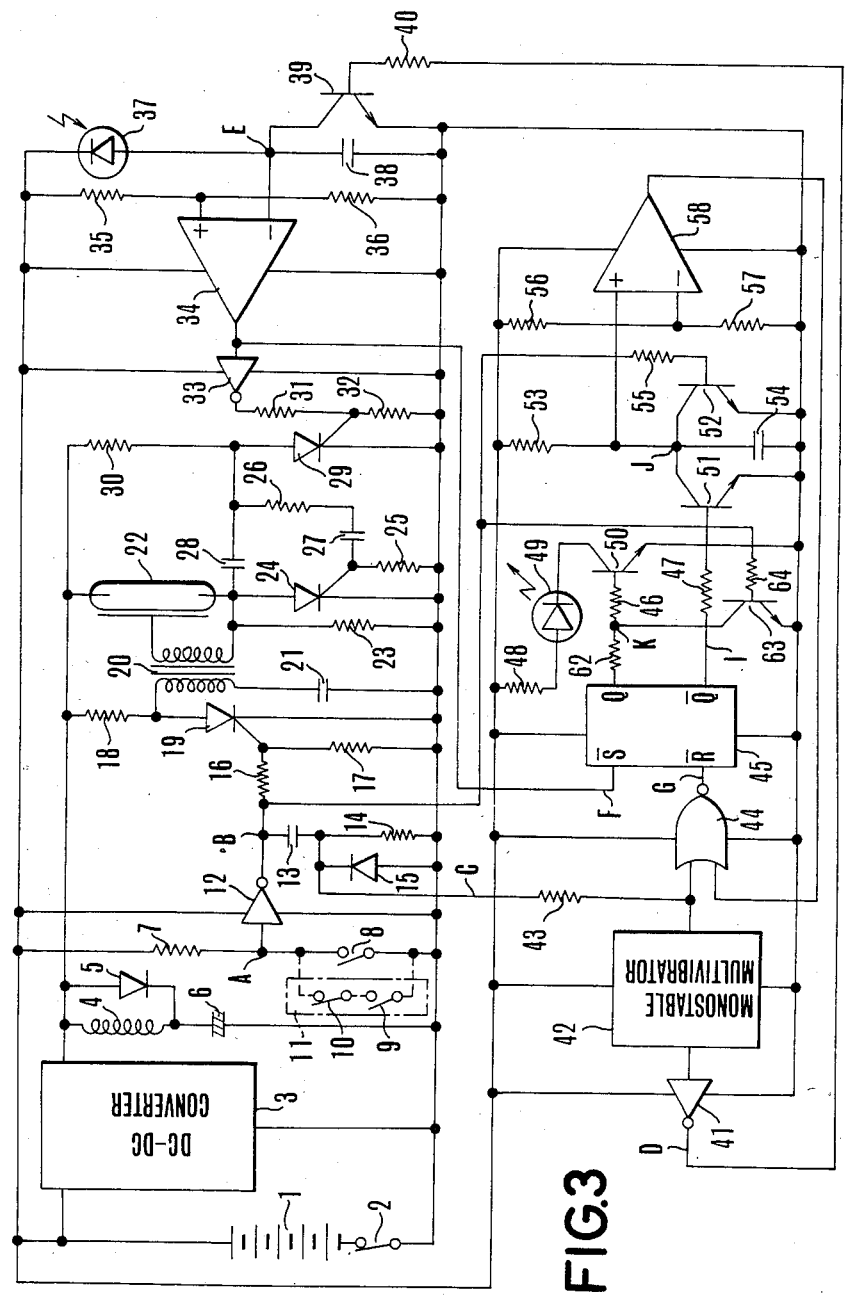
FIG. 3 shows another embodiment of the flash light device circuit of the present invention.

FIG. 3 shows another embodiment of the present invention, whereby the correct exposure signal is not represented during the exposure control cycle. The members having the same figures as these in FIG. 1 are the same members. Between the output terminal Q of the flip-flop 45 and the resistance 46, a resistance 62 is connected and the connecting point (K) of the resistances 46 and 62 is connected to the collector of the transistor 63. The base of the transistor 62 is connected to B via the resistance 64.

Figure 4:
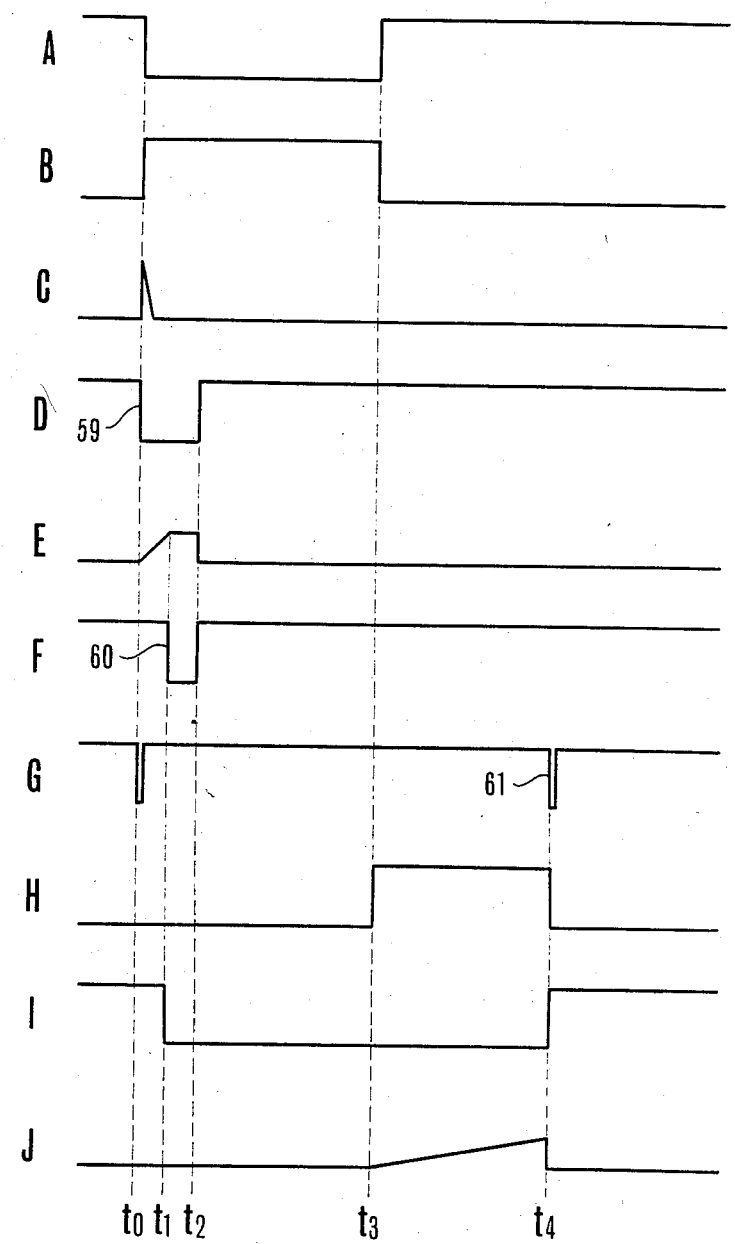
FIG. 4 shows a time chart for showing the wave forms at various points.

The operation of the second embodiment will be explained below in conjunction with the time chart in FIG. 4. During the shutter release, the output level of the inverter 12, namely the potential level at B is high so that the transistor 63 is switched on. Consequently, even if the flip-flop 45 is set the potential level at K is low and the transistor is not switched on so that the light emitting diode 49 is not turned on. When the trailing shutter curtain has run, the exposure control cycle has been finished and the safety switch 10 has been opened, the potential level at B becomes low so that the transistor 63 is switched off and the transistor 50 is switched on to put on the light emitting diode 49. Namely, the light emitting diode 49 turns on at t3 at which time the shutter release is off at t4, after a predetermined time.

As explained so far in detail, in accordance with the present invention after the lapse of a determined time after the exposure control cycle a timing signal is produced by the timer to stop the correct exposure representing signal so that it is possible to continue representing the correct exposure for a determined time after the shutter release has finished, no matter what the shutter time. Consequently, the photographer can recognize without fail the correct exposure even during slow shutter photography.

What I claim:

1. A correct exposure annunciator device for a camera comprising:
   correct exposure annunciator means;
   timer means for producing a timing signal after the lapse of a certain predetermined time after a synchronization switch has operated; and
   control means for operating the correct exposure annunciator means in accordance with generation of a correct exposure representing signal and deenergizing the correct exposure annunciator means with the generation of the timing signal from the timer means.

2. A correct exposure annunciator device according to claim 1, wherein said timer means includes:
   (a) a time constant circuit having a integrating capacitor;
   (b) a switching element connected across the integrating capacitor to render the integrating capacitor effective in response to running away of a trailing shutter curtain; and
   (c) a comparator connected across the integrating capacitor for producing the timing signal when an output of said integrating capacitor has reached a predetermined value.

3. A correct exposure annunciator device according to claim 1, wherein said control means includes a flip-flop circuit having a set terminal which is supplied with a correct exposure representing signal and a reset terminal which is supplied with the timing signal from the timer means.

4. A correct exposure annunciator device according to claim 3, further comprising:
   a gate connected to the reset terminal of said flip-flop circuit for resetting the flip-flop circuit in response to running away of a leading shutter curtain.

5. A correct exposure annunciator device according to claim 4, wherein said gate includes a NOR gate.

6. A correct exposure annunciator device for a camera comprising:
   (a) light measuring means having a light sensitive means and producing a correct exposure representing signal when the amount of the light reflected from the object reaches a certain predetermined value;
   (b) correct exposure annunciator means; and (c) timer means for energizing the correct exposure annunciator means in accordance with the correct exposure representing signal and during a certain predetermined time after a synchronization is disabled.

7. A correct exposure annunciator device for a camera comprising:
(a) light measuring means having a light sensitive means and producing a correct exposure representing signal when the amount of the light reflected from the object reaches a certain predetermined value for giving a proper exposure to a film;
(b) correct annunciator means; and
(c) timer means for energizing the correct exposure annunciator means in accordance with the correct exposure representing signal and during a certain predetermined time after a synchronization switch has opened.

* * * * *